United States Patent
Tsutsumi

(10) Patent No.: US 12,503,002 B2
(45) Date of Patent: Dec. 23, 2025

(54) ELECTRIFIED VEHICLE AND ELECTRIFIED VEHICLE SYSTEM WITH COMMUNICATION STANDARD COMPATIBILITY CONTROL

(71) Applicant: TOYOTA JIDOSHA KABUSHIKI KAISHA, Toyota (JP)

(72) Inventor: Daisuke Tsutsumi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 577 days.

(21) Appl. No.: 18/075,924

(22) Filed: Dec. 6, 2022

(65) Prior Publication Data
US 2023/0271525 A1    Aug. 31, 2023

(30) Foreign Application Priority Data
Feb. 28, 2022 (JP) .................. 2022-029650

(51) Int. Cl.
*B60L 53/66* (2019.01)
*B60L 3/00* (2019.01)
(Continued)

(52) U.S. Cl.
CPC ............. *B60L 53/66* (2019.02); *B60L 3/0092* (2013.01); *B60L 3/12* (2013.01); *B60L 53/305* (2019.02);
(Continued)

(58) Field of Classification Search
CPC .......... B60L 53/66; B60L 3/0092; B60L 3/12; B60L 53/305; B60L 53/63; B60L 53/65; B60L 53/68; H02J 7/00034
See application file for complete search history.

(56) References Cited

U.S. PATENT DOCUMENTS

2020/0247262 A1    8/2020    Takayama
2022/0289062 A1    9/2022    Nakao

FOREIGN PATENT DOCUMENTS

CN    110816359 A    2/2020
CN    111516517 A    8/2020
(Continued)

OTHER PUBLICATIONS

Machine translation of CN-106611983-B (Year: 2025).*
Machine translation of CN-111546926-A (Year: 2025).*

*Primary Examiner* — David V Henze-Gongola
(74) *Attorney, Agent, or Firm* — Dinsmore & Shohl LLP

(57) ABSTRACT

An electrified vehicle and a system of the electrified vehicle can perform power control including either or both of charging from a power station compatible with at least one version of a predetermined communication standard and power supply to the power station. The electrified vehicle includes a communication unit compatible with a plurality of the versions of the predetermined communication standard. The electrified vehicle further includes a control unit configured to control the communication unit in such a manner that power control protocol communication between the electrified vehicle and the power station is performed using the predetermined communication standard. Priority levels are set in advance for the plurality of the versions. The control unit is configured to decide the version to be used for the power control protocol communication based on the priority levels.

11 Claims, 5 Drawing Sheets

(51) Int. Cl.
*B60L 3/12* (2006.01)
*B60L 53/30* (2019.01)
*B60L 53/63* (2019.01)
*B60L 53/65* (2019.01)
*B60L 53/68* (2019.01)

(52) U.S. Cl.
CPC ............... *B60L 53/63* (2019.02); *B60L 53/65* (2019.02); *B60L 53/68* (2019.02)

(56) References Cited

FOREIGN PATENT DOCUMENTS

| | | | | | |
|---|---|---|---|---|---|
| CN | 111546926 | A | * | 8/2020 | .......... H02J 7/00045 |
| CN | 106611983 | B | * | 1/2021 | .............. B60L 53/63 |
| CN | 113147487 | A | * | 7/2021 | .............. B60L 53/66 |
| JP | 2014-064401 | A | | 4/2014 | |
| JP | 2016-071689 | A | | 5/2016 | |
| JP | 2020-127296 | A | | 8/2020 | |
| JP | 2022-139080 | A | | 9/2022 | |

\* cited by examiner

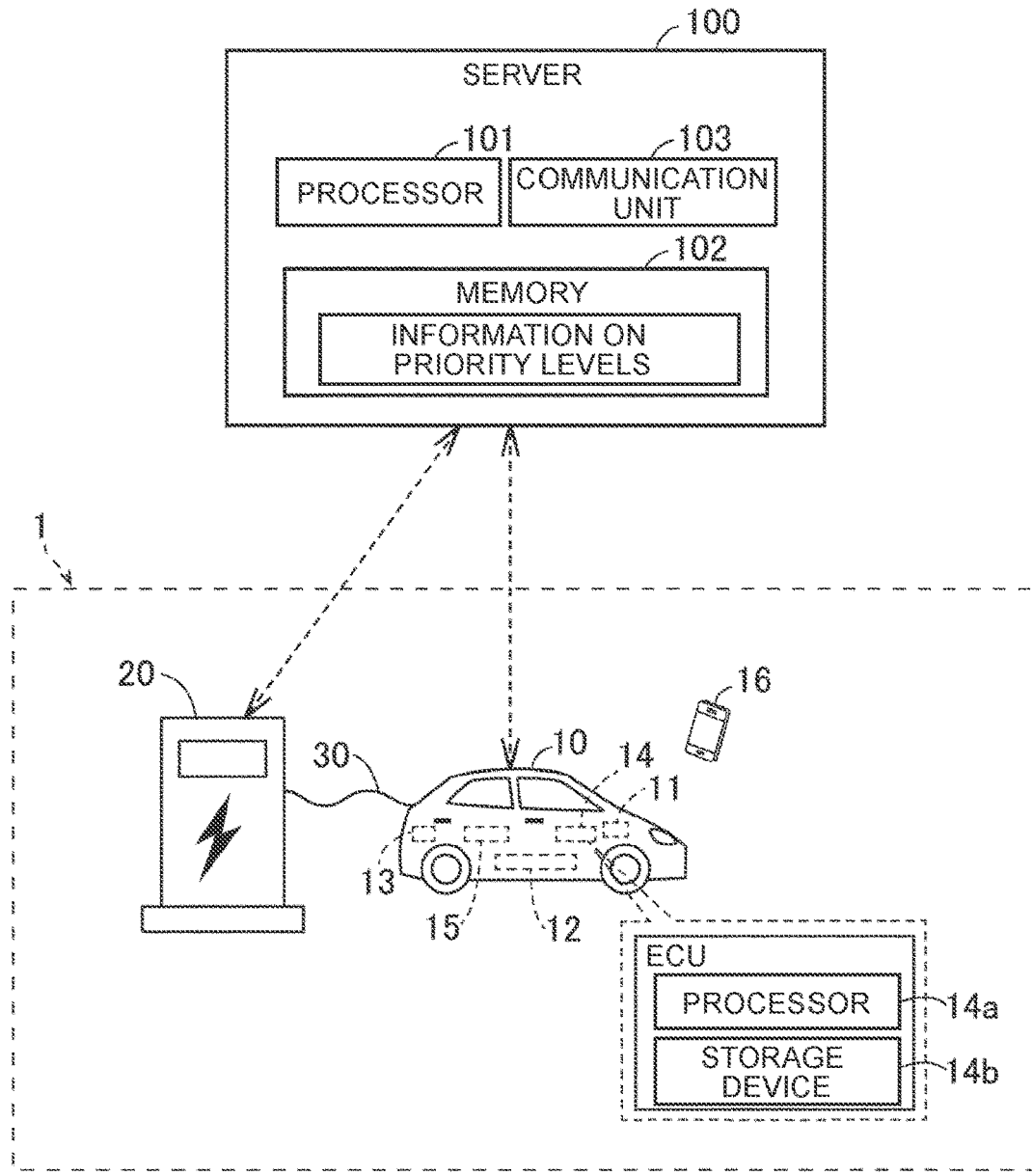

FIG. 7

| PRIORITY LEVEL | VERSION | RESULTS OF WHETHER POWER CONTROL PROTOCOL COMMUNICATION IS POSSIBLE |
|---|---|---|
| FIRST PRIORITY LEVEL | VERSION A | POSSIBLE |
| SECOND PRIORITY LEVEL | VERSION B | POSSIBLE |
| THIRD PRIORITY LEVEL | VERSION C | POSSIBLE |

ELECTRIFIED VEHICLE AND ELECTRIFIED VEHICLE SYSTEM WITH COMMUNICATION STANDARD COMPATIBILITY CONTROL

CROSS-REFERENCE TO RELATED APPLICATION

This application claims priority to Japanese Patent Application No. 2022-029650 filed on Feb. 28, 2022, incorporated herein by reference in its entirety.

BACKGROUND

1. Technical Field

The present disclosure relates to electrified vehicles and electrified vehicle systems.

2. Description of Related Art

For example, a charging system described in Japanese Unexamined Patent Application Publication No. 2020-127296 (JP 2020-127296 A) includes a vehicle and a charger that are electrically connected to each other. The vehicle includes a central processing unit (CPU) that controls transmission and reception of messages according to a predetermined communication sequence to charge a battery. When a message received from the charger is a predetermined specific signal, the CPU proceeds with the communication sequence regardless of the content indicated by the specific signal.

SUMMARY

In JP 2020-127296 A, as described above, when a message received from the charger is a predetermined specific signal, the CPU of the vehicle proceeds with the communication sequence regardless of the content indicated by the specific signal. However, JP 2020-127296 A does not consider a communication standard that is used for charging protocol communication between the vehicle and the charger. For example, when a vehicle is compatible with a plurality of versions of a predetermined communication standard, a version that is not suitable for the charging protocol communication may be used for the charging protocol communication due to one of a plurality of the versions being randomly selected. In this case, it would be difficult to charge the vehicle. An electrified vehicle is therefore desired that can appropriately perform power control such as charging when the electrified vehicle is compatible with a plurality of versions of a predetermined communication standard.

The present disclosure provides an electrified vehicle and electrified vehicle system that can appropriately perform power control such as charging when the electrified vehicle is compatible with a plurality of versions of a predetermined communication standard.

A first aspect of the present disclosure relates to an electrified vehicle including a communication unit and a control unit. The electrified vehicle can perform power control including either or both of charging from a power station compatible with at least one version of a predetermined communication standard and power supply to the power station. The communication unit is configured to be compatible with a plurality of the versions of the predetermined communication standard. The control unit is configured to control the communication unit in such a manner that power control protocol communication between the electrified vehicle and the power station is performed using the predetermined communication standard. Priority levels are set in advance for the plurality of the versions. The control unit is configured to decide the version to be used for the power control protocol communication based on the priority levels. The electrified vehicle may be any one of a hybrid electric vehicle, a plug-in hybrid electric vehicle, a battery electric vehicle, and a fuel cell electric vehicle.

According to the electrified vehicle of the above aspect, the control unit decides the version to be used for the power control protocol communication based on the priority levels. Since the version of the predetermined communication standard is selected based on the priority levels, the possibility that a version not suitable for the power control protocol communication may be randomly selected can be easily reduced. Accordingly, when the electrified vehicle is compatible with the plurality of versions of the predetermined communication standard, the electrified vehicle can easily select an appropriate version and appropriately perform power control.

In the electrified vehicle of the above aspect, the plurality of the versions may include a first version and a second version with a priority level lower than the priority level of the first version. The control unit may be configured to control to switch to communication using the second version when communication using the first version fails in the power control protocol communication. According to the electrified vehicle of such an aspect, even when communication using the first version with a relatively high priority level fails, communication using the second version can be performed. This can more reliably reduce the possibility of failure of the power control protocol communication as compared to the case where communication is attempted using only the first version.

In the electrified vehicle with the above configuration, the control unit may be configured to control to switch to the communication using the second version with a priority level one level lower than the priority level of the first version when the communication using the first version fails in the power control protocol communication. According to the electrified vehicle with such a configuration, whether the communication using the second version with the next highest priority level after the first version is possible can be preferentially confirmed.

In the electrified vehicle of the above aspect, the communication unit may be configured to acquire information on a result of a past power control protocol communication for each of the plurality of the versions. The control unit may be configured to decide the version to be used for the power control protocol communication based on the information on the result and the priority levels. According to the electrified vehicle of the above aspect, the version to be used for the power control protocol communication can be decided in consideration of the result of the power control protocol communication in addition to the priority levels. This can more reliably reduce the possibility of failure of the power control protocol communication as compared to the case where the version to be used for the power control protocol communication is decided based only on the priority levels.

In the electrified vehicle with the above configuration, the information on the result may include information on whether the past power control protocol communication was possible. The plurality of the versions may include the version with which the past power control protocol communication was possible and the version with which the past power control protocol communication was not possible. The control unit may be configured to decide the version with which the past power control protocol communication was possible as the version to be used for the power control protocol communication. According to the electrified vehicle with such a configuration, the version with which the past power control protocol communication was not possible is less likely to be selected. This can even more reliably reduce the possibility of failure of the power control protocol communication.

In the electrified vehicle of the above aspect, the control unit may be configured to, when there is a plurality of the versions with which the past power control protocol communication was possible, decide the version with the highest priority level out of the plurality of the versions with which the past power control protocol communication was possible as the version to be used for the power control protocol communication. According to the electrified vehicle with such a configuration, the version that is most suitable for the power control protocol communication out of the plurality of the versions with which the past power control protocol communication was possible can be used for the power control protocol communication.

In the electrified vehicle of the above aspect, the control unit may be configured to, when communication using the plurality of the versions with which the past power control protocol communication was possible all fails in the power control protocol communication, control to switch to communication using the version with which the past power control protocol communication was not possible. According to the electrified vehicle with such a configuration, the possibility of successful power control protocol communication can be increased, as compared to the case where the version is not switched to the version with which the past power control protocol communication was not possible.

In the electrified vehicle with the above configuration in which the control unit controls to switch to communication using the version with which the past power control protocol communication was not possible, the control unit may be configured to, when the communication using the version with which the past power control protocol communication was not possible is successful, control the communication unit in such a manner that information on whether the power control protocol communication was possible is updated for the version with which the power control protocol communication is successful. According to the electrified vehicle with such a configuration, for the next power control protocol communication, the version to be used for the power control protocol communication can be decided based on the latest information on whether the power control protocol communication was possible.

In the electrified vehicle of the above aspect, the communication unit may be configured to communicate with a first server storing the information on the result of the power control protocol communication. The control unit may be configured to control the communication unit in such a manner that the information on the result of the power control protocol communication is acquired from the first server. According to the electrified vehicle with such a configuration, the electrified vehicle need not to store the information on the result. This can save the trouble of storing the information on the result in a storage device etc. of the electrified vehicle, and can reduce the amount of data stored in the storage device etc. of the electrified vehicle.

In the electrified vehicle with the above configuration, the communication unit may be configured to communicate with a second server storing information on the priority levels. The control unit may be configured to control the communication unit in such a manner that the information on the priority levels is acquired from the second server. According to the electrified vehicle with such a configuration, the electrified vehicle need not store the information on the priority levels. This can save the trouble of storing the information on the priority levels in the storage device etc. of the electrified vehicle, and can further reduce the amount of data stored in the storage device etc. of the electrified vehicle.

A second aspect of the present disclosure relates to an electrified vehicle system including a power station and an electrified vehicle. The power station is configured to be compatible with at least one version of a predetermined communication standard. The electrified vehicle is configured to perform power control including either or both of charging from the power station and power supply to the power station. The electrified vehicle includes a communication unit and a control unit. The communication unit is configured to be compatible with a plurality of the versions of the predetermined communication standard. The control unit is configured to control the communication unit in such a manner that power control protocol communication between the electrified vehicle and the power station is performed using the predetermined communication standard. Priority levels are set in advance for the plurality of the versions, and the control unit is configured to decide the version to be used for the power control protocol communication based on the priority levels.

According to the electrified vehicle system of the above aspect, the control unit decides the version to be used for the power control protocol communication based on the priority levels. Since the version of the predetermined communication standard is selected based on the priority levels, the possibility that a version not suitable for the power control protocol communication may be randomly selected can be easily reduced. Accordingly, the electrified vehicle system can be provided that can easily select an appropriate version and appropriately perform power control when the electrified vehicle is compatible with the plurality of versions of the predetermined communication standard.

The electrified vehicle and the electrified vehicle system according to the present disclosure can appropriately perform power control such as charging when the electrified vehicle is compatible with the plurality of versions of the predetermined communication standard.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 shows configurations of an electrified vehicle, electric vehicle supply equipment (EVSE), and a server according to a first embodiment of the present disclosure;

FIG. 2 shows the relationship between the versions of a predetermined communication standard and the priority levels according to the first embodiment and a second embodiment of the present disclosure;

FIG. 7 shows the updated relationship between the versions of the predetermined communication standard and the results of the power control protocol communication according to the second embodiment.

DETAILED DESCRIPTION OF EMBODIMENTS

Figure 3:
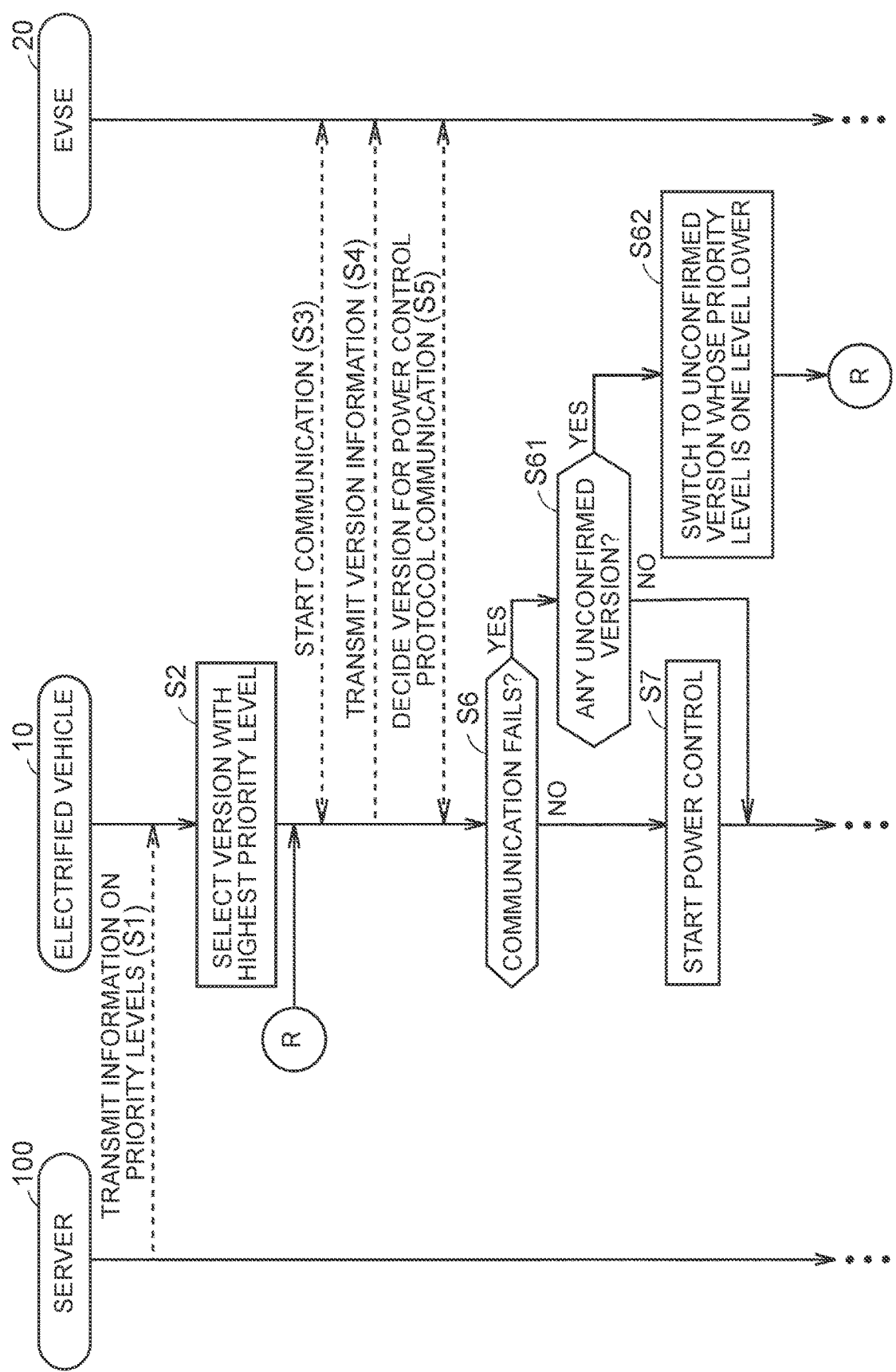
FIG. 3 shows sequence control among the electrified vehicle, the EVSE, and the server according to the first embodiment.

Hereinafter, embodiments of the present disclosure will be described in detail with reference to the drawings. The same or corresponding portions are denoted by the same signs throughout the drawings, and description thereof will not be repeated.

First Embodiment

FIG. 1 shows schematic configurations of an electrified vehicle 10 and an electrified vehicle system 1 according to a first embodiment of the present disclosure.

The electrified vehicle system 1 includes an electrified vehicle 10 and electric vehicle supply equipment (EVSE) 20. The EVSE 20 is an example of the "power station" of the present disclosure.

The electrified vehicle 10 is configured to communicate with the EVSE 20 according to a predetermined communication standard. Examples of the predetermined communication standard include the CHAdeMO standard, the GB/T standard, and the Communications Standards Summary (CSS) standard.

A server 100 is a server that manages communication between the electrified vehicle 10 and the EVSE 20. The server 100 is configured to communicate with each of the electrified vehicle 10 and the EVSE 20. The server 100 is an example of the "second server" of the present disclosure.

The server 100 includes a processor 101, a memory 102, and a communication unit 103. The processor 101 performs predetermined information processing. The memory 102 is configured to save various kinds of information. The memory 102 stores programs to be executed by the processor 101 and information to be used in the programs (e.g., maps, mathematical expressions, and various parameters). The communication unit 103 includes various communication interfaces (I/Fs).

The server 100 is configured to manage information on a plurality of registered electrified vehicles 10 (hereinafter also referred to as "vehicle information"), information on each registered user (hereinafter also referred to as "user information"), and information on registered EVSE 20 (hereinafter also referred to as "EVSE information"). The user information, the vehicle information, and the EVSE information are distinguished by identification information (ID) and stored in memory 102.

A user ID is identification information identifying the user, and also functions as information (terminal ID) identifying a mobile terminal 16 carried by the user. The server 100 is configured to distinguish information received from the mobile terminals 16 by the user IDs and store the received information for each user ID. The user information includes a communication address of the mobile terminal 16 carried by the user and a vehicle ID of the electrified vehicle 10 belonging to the user.

The vehicle ID is identification information identifying the electrified vehicle 10. The vehicle ID may be a license plate number or a vehicle identification number (VIN). The vehicle information includes an action plan of each electrified vehicle 10.

An EVSE ID is identification information identifying the EVSE 20. The EVSE information includes a communication address of each piece of EVSE 20 and the state of the electrified vehicle 10 connected to each piece of EVSE 20. The EVSE information further includes information indicating a combination of the electrified vehicle 10 and the EVSE 20 that are connected to each other (e.g., a combination of the EVSE ID and the vehicle ID).

The electrified vehicle 10 is configured to perform power control including charging from the EVSE 20 (external charging) and power supply to the EVSE 20 (external power supply). The electrified vehicles 10 include, for example, a hybrid electric vehicle, a plug-in hybrid electric vehicle (PHEV), a battery electric vehicle (BEV), and a fuel cell electric vehicle (FCEV). The electrified vehicles 10 may include either or both of a personally owned vehicle (POV) and a vehicle managed by a Mobility as a Service (MaaS) operator (MaaS vehicle). The electrified vehicle 10 may be configured to perform only external power supply or external charging.

The electrified vehicle 10 includes a drive motor 11, a battery 12, a communication unit 13, an electronic control unit (ECU) 14, and a charger and discharger 15.

The battery 12 supplies electric power to the drive motor 11. The battery 12 includes a secondary battery that stores electric power for driving the electrified vehicle 10. The secondary battery is an assembled battery that includes a plurality of lithium-ion cells or a plurality of nickel metal hydride cells. Other energy storage devices such as an electric double-layer capacitor may be used instead of the secondary battery.

The communication unit 13 communicates with each of the server 100 and the EVSE 20. The communication unit 13 may include a communication I/F compatible with a Data Communication Module (DCM) or a 5th generation (5G) mobile communication system.

The ECU 14 performs power control (charge control and discharge control) of the battery 12. The ECU 14 includes a processor 14a and a storage device 14b. The ECU 14 may be a computer or a central processing unit (CPU). The storage device 14b is configured to save stored information. The storage device 14b stores programs and information to be used in the programs (e.g., maps, mathematical expressions, and various parameters). Various controls in the ECU 14 are performed by the processor 14a executing the programs stored in the storage device 14b. The processor 14a is an example of the "control unit" of the present disclosure.

The EVSE 20 means power supply equipment for vehicles. The electrified vehicle 10 is configured to be electrically connected to the EVSE 20. For example, electric power can be transferred between the EVSE 20 and the electrified vehicle 10 by connecting a charging cable 30 connected to the EVSE 20 to an inlet of the electrified vehicle 10. Any desired number of pieces of EVSE 20 may be managed by the electrified vehicle system 1. The number of pieces of EVSE 20 managed by the electrified vehicle system 1 may be about five, 10 or more, or 100 or more.

The EVSE 20 includes direct current (DC) EVSE. Therefore, DC power is supplied from the electrified vehicle 10 to the EVSE 20, and an inverter in the EVSE 20 converts the DC power to alternating current (AC) power. The charger and discharger 15 that adjusts the charge and discharge power of the battery 12 of the electrified vehicle 10 is configured to adjust the charge and discharge power by, for example, a direct current to direct current (DC to DC) converter. In some embodiments, the EVSE 20 may not be a DC EVSE. In some embodiments, the EVSE 20 may be an AC EVSE.

The EVSE 20 is compatible with at least one version of the predetermined communication standard. In the first embodiment, the EVSE 20 is compatible with version A, version B, and version C of the predetermined communication standard. In the first embodiment, version A is the latest, followed by version B, and then version C.

The communication unit 13 of the electrified vehicle 10 is compatible with a plurality of versions of the predetermined communication standard. In the first embodiment, the communication unit 13 of the electrified vehicle 10 is compatible with version A, version B, and version C of the predetermined communication standard. Although an example in which the electrified vehicle 10 and the EVSE 20 are compatible with the same versions is described herein, the electrified vehicle 10 and the EVSE 20 may be compatible with different versions from each other.

The processor 14a of the electrified vehicle 10 controls the communication unit 13 so that power control protocol communication between the electrified vehicle 10 and the EVSE 20 is performed using the predetermined communication standard. Specifically, the processor 14a performs control to decide the version of the predetermined communication standard to be used for the power control protocol communication between the communication unit 13 and the EVSE 20. A method for deciding the version will be described later in detail. The power control protocol communication in the first embodiment means communication for deciding the protocol between the electrified vehicle 10 and the EVSE 20 that is necessary to start the power control.

Priority levels (priorities) are set in advance for the plurality of versions (A to C) of the predetermined communication standard. For example, the priority levels are set so that the latest version has the highest priority level and the oldest version has the lowest priority (that is, version A has the highest priority level, followed by version B, and then version C). Information on the priority levels is stored in the memory 102 of the server 100. Specifically, the memory 102 stores the relationship between the priority levels and the versions of the predetermined communication standard. The memory 102 may store a table in which the priority levels are associated with the versions of the predetermined communication standard.

A charging system including an electrified vehicle that, when a message received from EVSE is a predetermined specific signal, proceeds with a communication sequence regardless of the content indicated by the specific signal is conventionally known in the art. However, this charging system does not consider the communication standard that is used for charging protocol communication between the electrified vehicle and the EVSE. For example, when a vehicle is compatible with a plurality of versions of a predetermined communication standard, a version that is not suitable for the charging protocol communication may be used for the charging protocol communication due to one of the plurality of the versions being randomly selected. In this case, it would be difficult to charge the vehicle. An electrified vehicle (electrified vehicle system) is therefore desired that can appropriately perform power control such as charging when the electrified vehicle is compatible with a plurality of versions of a predetermined communication standard.

Therefore, in the first embodiment, the processor 14a of the electrified vehicle 10 decides the version to be used for the power control protocol communication based on the priority levels. Specifically, the processor 14a controls the communication unit 13 so that the information on the priority levels is acquired from the server 100 (memory 102). The processor 14a then selects a version to be used for the power control protocol communication based on the acquired information on the relationship between the priority levels and the versions (A to C).

Specifically, the processor 14a (first) selects version A with the highest priority level as a version to be used for the power control protocol communication from the plurality of the versions (A to C).

In the first embodiment, when communication using version A fails in the power control protocol communication, the processor 14a controls to switch to communication using version B whose priority level is one level lower than the priority level of version A. Version A and version B in this case are an example of the "first version" and the "second version" of the present disclosure, respectively. Examples of the "failure" of communication includes when no response signal is returned from the EVSE within a predetermined period in response to a request signal from the vehicle and when there is no response from the EVSE even after retrying.

Thereafter, when communication using version B also fails in the power control protocol communication, the processor 14a controls to switch to communication using version C whose priority level is one level lower than the priority level of version B. Version B and version C in this case are an example of the "first version" and the "second version" of the present disclosure, respectively.

Sequence Control

Next, a method for deciding the version of the predetermined communication standard to be used for the power control protocol communication will be described with reference to the sequence diagram of FIG. 3. FIG. 3 illustrates a method for deciding the version to be used for protocol communication that is performed until the power control starts.

First, in step S1, the server 100 transmits the information on the priority levels (information on the relationship between the priority levels and the plurality of the versions of the predetermined communication standard, see FIG. 2) to the electrified vehicle 10 (communication unit 13). At this time, the electrified vehicle 10 (processor 14a) controls the communication unit 13 so that the information on the priority levels is acquired from the server 100 (memory 102).

Next, in step S2, the processor 14a selects the version with the highest priority level (version A) as a version to be used for communication with the EVSE 20, based on the information on the priority levels acquired in step S1.

In step S3, communication using version A is thus started between the electrified vehicle 10 (communication unit 13) and the EVSE 20. As a result, information can be exchanged between the electrified vehicle 10 and the EVSE 20.

Thereafter, in step S4, the electrified vehicle 10 (communication unit 13) transmits information on the version used for communication to the EVSE 20. Specifically, the communication unit 13 notifies the EVSE 20 that version A is used for communication with the EVSE 20.

Subsequently, in step S5, the version to be used for the power control protocol communication is decided based on the information transmitted from the electrified vehicle 10 to the EVSE 20 in step S4. For example, the electrified vehicle 10 and the EVSE 20 may decide that the electrified vehicle 10 and the EVSE 20 are going to perform the power control protocol communication by mutually using version A selected in step S2.

Thereafter, in step S6, the processor 14*a* determines whether the power control protocol communication using version A fails (determines communication compatibility). Specifically, this determination may include a sticking check phase, an insulation test phase, a handshake phase, and a power control specification placement phase.

In the sticking check phase, the processor 14*a* determines whether a contactor in the electrified vehicle 10 is not sticking. In the insulation test phase, wire insulation between the electrified vehicle 10 and the EVSE 20 electrically connected to each other is determined. In the handshake phase, charging (discharging) compatibility information and identification messages are exchanged between the electrified vehicle 10 and the EVSE 20. In the power control specification placement phase, the electrified vehicle 10 and the EVSE 20 transmit and receive various charging (discharging) specification messages to and from each other to determine whether charging (discharging) is possible for both the electrified vehicle 10 and the EVSE 20.

When the processor 14*a* determines in step S6 that the power control protocol communication has failed (Yes in S6), the routine proceeds to step S61. When the processor 14*a* determines in step S6 that the power control protocol communication is successful (No in S6), the routine proceeds to step S7.

In step S61, the processor 14*a* determines whether there is any version for which whether the power control protocol communication is possible has not been confirmed. When the processor 14*a* determines in step S61 that there is a version(s) for which whether the power control protocol communication is possible has not been confirmed (Yes in S61), the routine proceeds to step S62. When the processor 14*a* determines in step S61 that there is no version for which whether the power control protocol communication is possible has not been confirmed (No in S61), the routine ends. Specifically, in the first step S61, whether the power control protocol communication using version B and version C is possible has not been confirmed. Therefore, the routine proceeds from step S61 to step S62.

In step S62, the processor 14*a* switches the version to be used for the power control protocol communication to the version whose priority level is one level lower out of the plurality of the versions for which whether the power control protocol communication is possible has not been confirmed. That is, the processor 14*a* switches the version to be used for the power control protocol communication to the version with the highest priority level out of the plurality of the versions for which whether the power control protocol communication is possible has not been confirmed. Specifically, when the processor 14*a* determines in step S6 that the power control protocol communication using version A has failed, the processor 14*a* switches the version to be used for the power control protocol communication to version B with the next highest priority level after version A.

The routine then returns to between steps S2 and S3, and step S3 and the subsequent steps are repeated. Specifically, in the second step S6, the processor 14*a* determines whether the power control protocol communication using version B switched in step S62 fails. When the routine subsequently proceeds to step S62, the processor 14*a* switches the version to be used for the power control protocol communication to version C with the next highest priority level after version B.

The routine then returns again to between steps S2 and S3. In the third step S6, the processor 14*a* determines whether the power control protocol communication using version C switched in step S62 fails. When the routine subsequently proceeds to step S61, the processor 14*a* determines in step S61 that there is no version for which whether the power control protocol communication is possible has not been confirmed (No in S61). The routine therefore ends.

In step S7, the power control between the electrified vehicle 10 and the EVSE 20 is started based on the version for which the processor 14*a* has determined in step S6 that the power control protocol communication is possible.

Second Embodiment

Next, control in an electrified vehicle 110 (electrified vehicle system 21) according to a second embodiment of the present disclosure will be described. In the second embodiment, unlike the first embodiment in which the version of the predetermined communication standard to be used for the power control protocol communication is decided based only on the priority levels, the version is decided based on the priority levels and the results of the power control protocol communication. The same configurations as those of the first embodiment are denoted by the same signs as those of the first embodiment, and detailed description thereof will not be repeated.

Figure 4:
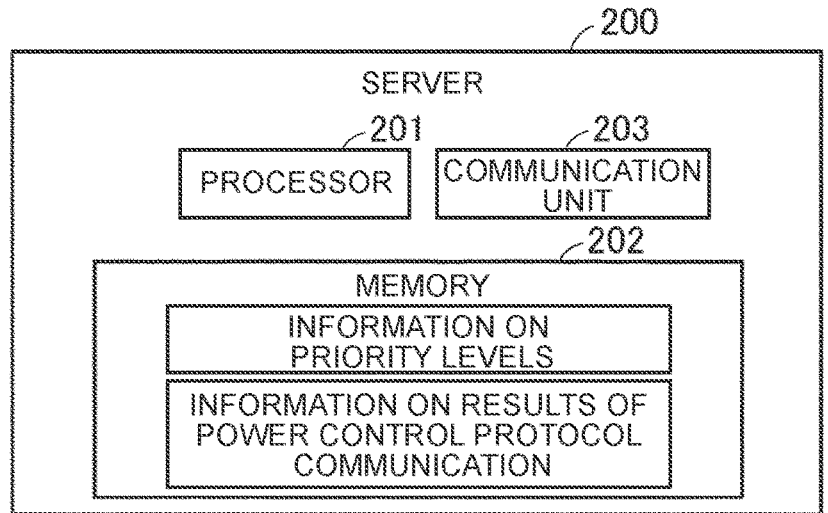
FIG. 4 shows configurations of an electrified vehicle, EVSE, and a server according to the second embodiment.

FIG. 4 shows schematic configurations of the electrified vehicle 110 and the electrified vehicle system 21 according to the second embodiment of the present disclosure.

The electrified vehicle system 21 includes an electrified vehicle 110 and EVSE 20.

A server 200 is a server that manages communication between the electrified vehicle 110 and the EVSE 20. The server 200 is configured to communicate with each of the electrified vehicle 110 and the EVSE 20. The server 200 is an example of the "first server" and the "second server" of the present disclosure.

The server 200 includes a processor 201, a memory 202, and a communication unit 203. The processor 201 performs predetermined information processing. The memory 202 is configured to save various kinds of information. The memory 202 stores programs to be executed by the processor 201 and information to be used in the programs (e.g., maps, mathematical expressions, and various parameters). The communication unit 203 includes various communication I/Fs.

Figure 5:
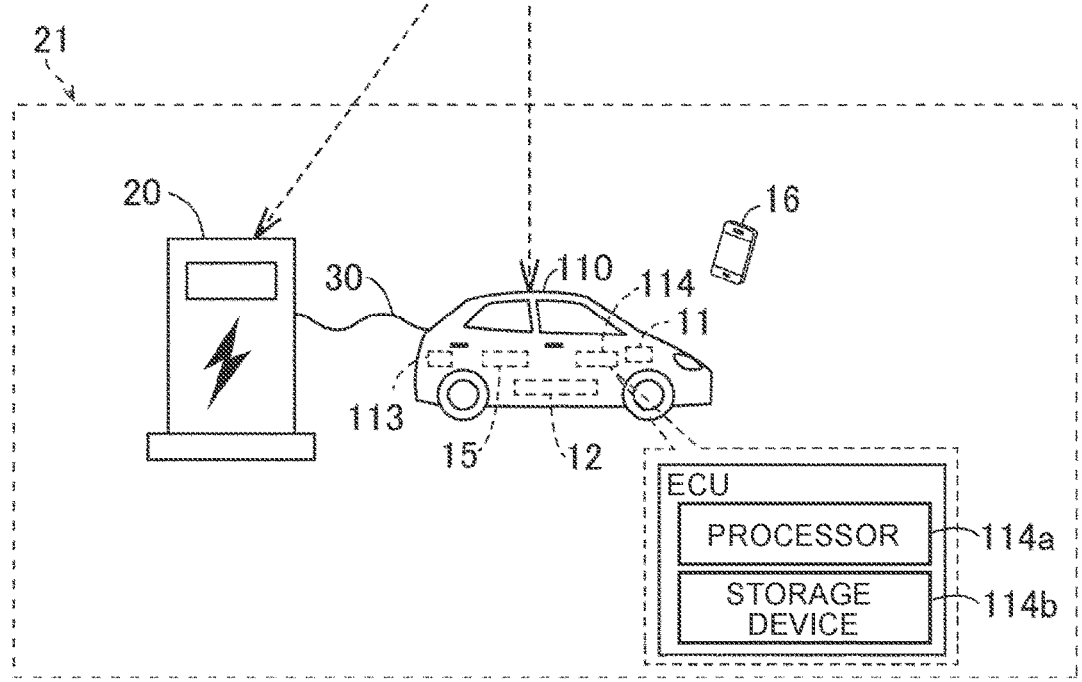
FIG. 5 shows the relationship between the versions of the predetermined communication standard and the results of power control protocol communication according to the second embodiment.

The memory 202 of the server 200 stores information on the results of the power control protocol communication in addition to the information on the priority levels described in the first embodiment. The information on the results of the power control protocol communication includes information on whether the past (previous) power control protocol communication was possible. Specifically, as shown in FIG. 5, the memory 202 stores, for each of versions A to C, information on whether the past (previous) power control protocol communication was possible. For example, the memory 202 may store a table in which the priority levels, the version information, and the results are associated with each other. In the second embodiment, it is assumed as an example that the past power control protocol communication using version A failed and the past power control protocol communication using version B and version C was successful.

As shown in FIG. 4, the electrified vehicle 110 includes a communication unit 113 and an ECU 114. The communication unit 113 communicates with each of the server 200 and the EVSE 20. The ECU 114 includes a processor 114a and a storage device 114b. Various controls in the ECU 114 are performed by the processor 114a executing the programs stored in the storage device 114b. The processor 114a is an example of the "control unit" in the present disclosure.

The processor 114a controls the communication unit 113 so that the information (see FIG. 5) on the results of the power control protocol communication is acquired from the server 200 (memory 202). That is, the communication unit 113 acquires from the memory 202 the information on the results of the past power control protocol communication for each of versions A to C, based on control (command) performed by the processor 114a.

In the second embodiment, the processor 114a decides the version to be used for the power control protocol communication based on the information on the results and the priority levels. That is, the processor 114a decides the version to be used for the power control protocol communication based on the priority levels and the information on whether the past (previous) power control protocol communication was possible.

Specifically, the processor 114a decides the version with which the past (previous) power control protocol communication was possible (hereinafter referred to as version for which the result is "possible") as a version to be used for the power control protocol communication. Specifically, when there is a plurality of versions for which the result is "possible," the processor 114a decides the version with the highest priority level out of the plurality of the versions for which the result is "possible" as a version to be used for the power control protocol communication. In the second embodiment, as described above, since the results for version B and version C are "possible," the processor 114a (first) decides version B with the higher priority level as a version to be used for the power control protocol communication.

When the power control protocol communication using the version for which the result is "possible" fails, the processor 114a controls to switch to communication using the version whose priority level is one level lower than the priority level of the failed version. That is, when the power control protocol communication using version B fails, the processor 114a next selects version C as a version to be used for the power control protocol communication.

When communication using the plurality of the versions for which the result is "possible" all fails in the power control protocol communication, the processor 114a controls to switch to communication using the version with which the past power control protocol communication was not possible (hereinafter referred to as version for which the result is "not possible"). Specifically, when the power control protocol communication using version B and version C fails, the processor 114a next selects version A as a version to be used for the power control protocol communication. When there is a plurality of versions for which the result is "not possible," the processor 114a confirms in descending order of priority level whether communication using each of the plurality of the versions for which the result is "not possible" is possible.

When the power control protocol communication using the version for which the result is "not possible" is successful, the processor 114a controls the communication unit 113 so that the information on whether the power control protocol communication was possible is updated for the successful version. Specifically, when the power control protocol communication using version A is successful, the result ("not possible") for version A stored in the memory 202 of the server 200 is changed to "possible."

When the power control protocol communication using the version for which the result is "possible" fails, the processor 114a controls the communication unit 113 so that the information on whether the power control protocol communication was possible is updated for the failed version. Specifically, when the power control protocol communication using version B (C) fails, the result ("possible") for version B (C) stored in the memory 202 of the server 200 is changed to "not possible."

Sequence Control

Figure 6:
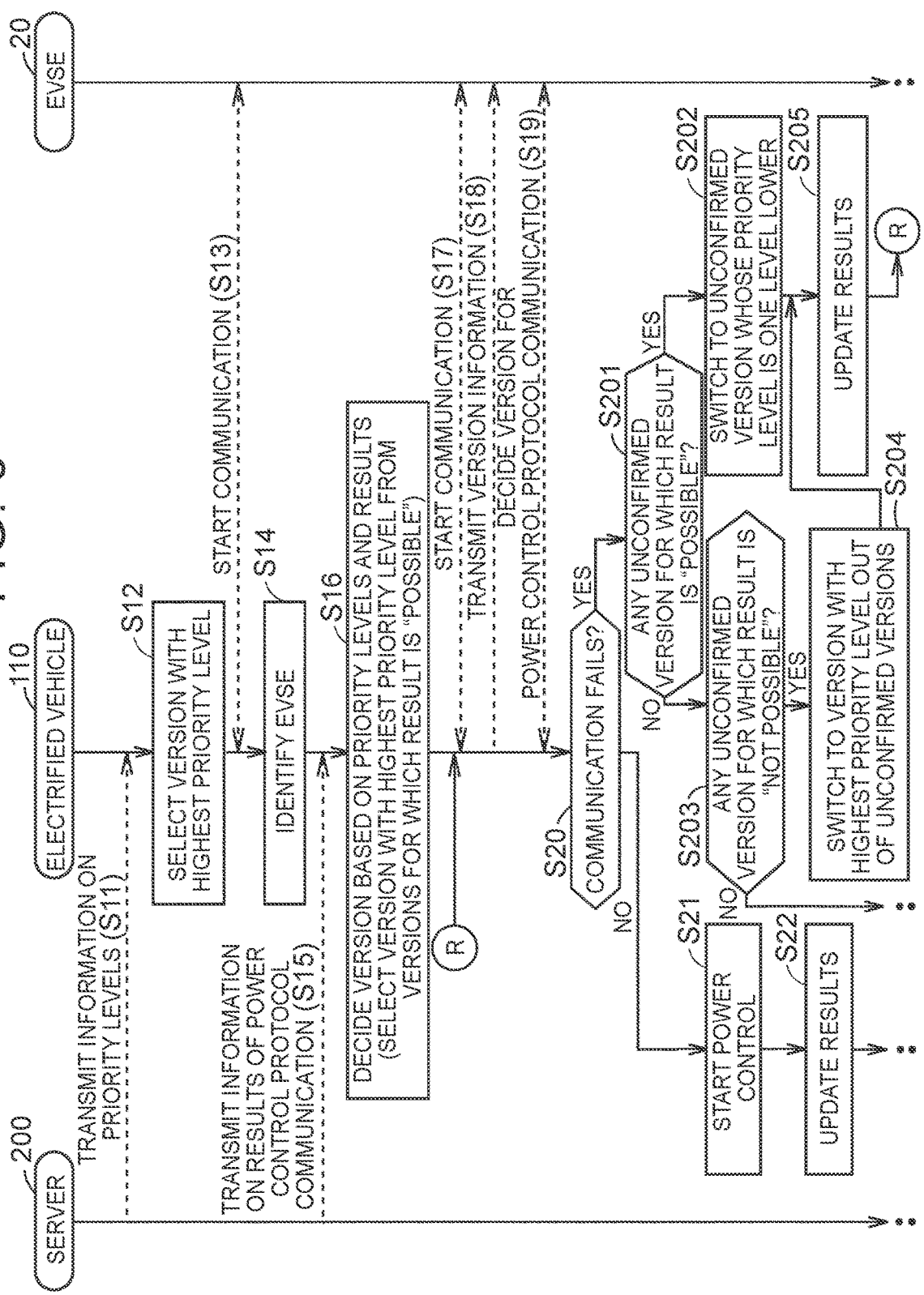
FIG. 6 shows sequence control among the electrified vehicle, the EVSE, and the server according to the second embodiment.

Next, a method for deciding the version of the predetermined communication standard to be used for the power control protocol communication will be described with reference to the sequence diagram of FIG. 6. FIG. 6 illustrates a method for deciding the version to be used for protocol communication that is performed until the power control starts.

Since steps S11 to S13 are similar to steps S1 to S3 (see FIG. 3) of the first embodiment, respectively, description thereof will not be repeated.

In step S14, the electrified vehicle 110 (processor 114a) identifies the EVSE 20 on which the power control is to be performed. The processor 114a may identify the EVSE 20 based on, for example, the EVSE ID transmitted from the EVSE 20, model number information of the EVSE 20, or a Global Positioning System (GPS) function.

Next, in step S15, the server 200 transmits, to the communication unit 113, information on whether the past (previous) power control protocol communication was possible (see FIG. 5) for the EVSE 20 identified by the processor 114a in step S14. That is, the processor 114a controls the communication unit 113 so that the information on whether the power control protocol communication was possible for the EVSE 20 identified in step S14 is acquired from the server 200 (memory 202).

Next, in step S16, the processor 114a decides the version to be used for the power control protocol communication based on the information on whether the past (previous) power control protocol communication was possible acquired in step S15 and the priority levels. Specifically, the processor 114a decides version B with the highest priority level out of versions B and C for which the result is "possible" as a version to be used for the power control protocol communication. When there is no version for which the result is "possible" in step S16, the processor 114a may decide the version with the highest priority level out of the plurality of the versions for which the result is "not possible" as a version to be used for the power control protocol communication.

Thereafter, in step S17, communication using the version decided in step S16 is started between the electrified vehicle 10 (communication unit 113) and the EVSE 20.

Since subsequent steps S18 and S19 are similar to steps S4 and S5 (see FIG. 3) of the first embodiment, respectively, description thereof will not be repeated.

Subsequently, in step S20, the processor 114a determines whether the power control protocol communication using version B fails (determines communication compatibility). Since a specific example of this determination is similar to that of the first embodiment, description thereof will not be repeated.

When the processor 114a determines in step S20 that the power control protocol communication has failed (Yes in S20), the routine proceeds to step S201. When the processor 114a determines in step S20 that the power control protocol communication is successful (No in S20), the routine proceeds to step S21.

In step S201, the processor 114a determines whether there is any version for which the result is "possible" and for which whether the power control protocol communication is possible has not been confirmed. When the processor 114a determines in step S201 that there is a version(s) for which the result is "possible" and for which whether the power control protocol communication is possible has not been confirmed (Yes in S201), the routine proceeds to step S202. When the processor 114a determines in step S201 that there is no version for which the result is "possible" and for which whether the power control protocol communication is possible has not been confirmed (No in S201), the routine proceeds to step S203.

Specifically, in the first step S201, whether the power control protocol communication using version B is possible has only been confirmed out of versions B and C for which the result is "possible." In other words, whether the power control protocol communication using version C is possible has not been confirmed. Therefore, the routine proceeds from step S201 to step S202.

In step S202, the processor 114a switches the version to be used for the power control protocol communication to the version whose priority level is one level lower out of the plurality of the versions for which the result is "possible" and for which whether the power control protocol communication is possible has not been confirmed. That is, in step S202, the processor 114a switches the version to be used for the power control protocol communication to the version with the highest priority level out of the plurality of the versions for which the result is "possible" and for which whether the power control protocol communication is possible has not been confirmed. Specifically, when the processor 114a determines in step S20 that the power control protocol communication using version B has failed, the processor 114a switches the version to be used for the power control protocol communication from version B to version C in step S202. Version B and version C in this case are an example of the "first version" and the "second version" of the present disclosure, respectively.

Thereafter, in step S205, the processor 114a controls the communication unit 113 so that the results of the power control protocol communication stored in the memory 202 of the server 200 are updated. Specifically, the result of the power control protocol communication using version B is changed to "not possible."

The routine then returns to between steps S16 and S17, and step S17 and the subsequent steps are repeated. At this time, in step S17, communication using the version switched in step 202 is started. Specifically, in the second step S17, communication using version C is started. In the second step S20, the processor 114a determines whether the power control protocol communication using version C fails.

In the second step S201, the processor 114a determines that there is no version for which the result is "possible" and for which whether the power control protocol communication is possible has not been confirmed (No in S201). The routine therefore proceeds to step S203.

In step S203, the processor 114a determines whether there is any version for which the past (previous) result is "not possible" and for which whether the power control protocol communication is possible has not been confirmed. When the processor 114a determines in step S203 that there is a version(s) for which the past result is "not possible" and for which whether the power control protocol communication is possible has not been confirmed (Yes in S203), the routine proceeds to step S204. When the processor 114a determines in step S203 that there is no version for which the past result is "not possible" and for which whether the power control protocol communication is possible has not been confirmed (No in S203), the routine ends.

In step S204, the processor 114a switches the version to be used for the power control protocol communication to the version with the highest priority level out of the plurality of the versions for which the past (previous) result is "not possible" and for which whether the power control protocol communication is possible has not been confirmed. Specifically, in step S204, the processor 114a switches the version to be used for the power control protocol communication from version C to version A.

The routine then proceeds to step S205, and the result of the power control protocol communication using version C is changed to "not possible."

Thereafter, the routine returns again to between steps S16 and S17, and step S17 and the subsequent steps are repeated. At this time, in step S17, communication using the version switched in step 204 is started. Specifically, in the third step S17, communication using version A is started. In the third step S20, the processor 114a determines whether the power control protocol communication using version A fails.

In the third step S201, the processor 114a determines that there is no version for which the result is "possible" and for which whether the power control protocol communication is possible has not been confirmed (No in S201). The routine therefore proceeds to step S203. In the second step S203, the processor 114a determines that there is no version for which the result is "not possible" and for which whether the power control protocol communication is possible has not been confirmed (No in S203). The routine therefore ends.

When the processor 114a determines in the second step S203 that there is a version(s) for which the result is "not possible" and for which whether the power control protocol communication is possible has not been confirmed (Yes in S203) (it is herein assumed that this version is version D), the routine proceeds to step S204. Version A and version D in this case are an example of the "first version" and the "second version" of the present disclosure, respectively.

In step S21, the power control between the electrified vehicle 110 and the EVSE 20 is started based on the version for which the processor 114a has confirmed in step S20 that the power control protocol communication is possible.

Thereafter, in step S22, the processor 114a controls the communication unit 113 so that the results of the power control protocol communication stored in the memory 202 of the server 200 are updated. Specifically, when the processor 114a determines in step S20 that the power control protocol communication using version A for which the past result is "not possible" is successful (No in S20), the result of the power control protocol communication using version A is changed to "possible" (see FIG. 7).

The configurations of the second embodiment are otherwise similar to those of the first embodiment.

As described above, in the first and second embodiments, the processor 14a (114a) decides the version to be used for the power control protocol communication based on the priority levels. This can minimize the possibility that the version that has a low priority level and that is not suitable for the power control protocol communication may be used for the power control protocol communication.

The first and second embodiments show an example in which switching control is performed to use a version with a lower priority level when the power control protocol communication fails. However, the present disclosure is not limited to this. The routine may simply end when the power control protocol communication using the first selected version based on the priority levels fails.

The first and second embodiments show an example in which switching control is performed to use a version whose priority level is one level lower when the power control protocol communication fails. However, the present disclosure is not limited to this. Switching control may be performed to use a version whose priority level is two or more levels lower when the power control protocol communication fails.

The second embodiment shows an example in which the version to be used for the power control protocol communication is decided based on whether the previous power control protocol communication was possible. However, the present disclosure is not limited to this. For example, the version to be used for the power control protocol communication may be decided based on whether the success rate up to the previous power control protocol communication is equal to or higher than a predetermined value.

The second embodiment shows an example in which, when communication using a plurality of versions for which the result is "possible" all fails, communication is switched to communication using a version for which the result is "not possible." However, the present disclosure is not limited to this. Such switching to communication using a version for which the result is "not possible" need not necessarily be performed.

The second embodiment shows an example in which the information on the priority levels and the information on the results of the power control protocol communication are stored in the server 200. However, the present disclosure is not limited to this. The information on the priority levels and the information on the results of the power control protocol communication may be stored in different servers from each other.

The first and second embodiments show an example in which each of the communication unit 13 (113) and the EVSE 20 is compatible with three versions (A to C). However, the present disclosure is not limited to this. The communication unit 13 (113) may be compatible with two versions or four or more versions. The EVSE 20 may be compatible with one version, two versions, or four or more versions.

The first and second embodiments show an example in which the version to be used for the power control protocol communication for starting the power control is decided based on the priority levels. However, the present disclosure is not limited to this. The version to be used for the power control protocol communication during the power control may be decided based on the priority levels.

The various modifications described above may be combined as desired.

The embodiments disclosed herein shall be construed as illustrative and not restrictive in all respects. The scope of the present disclosure is shown by the claims rather than by the above description of the embodiments, and is intended to include all modifications within the meaning and scope equivalent to those of the claims.

What is claimed is:

1. An electrified vehicle that is able to perform power control including either or both of charging from a power station compatible with at least one version of a predetermined communication standard and power supply to the power station, the electrified vehicle comprising:
   a communication unit configured to be compatible with a plurality of the versions of the predetermined communication standard; and
   a control unit configured to control the communication unit in such a manner that power control protocol communication between the electrified vehicle and the power station is performed using the predetermined communication standard, wherein;
   priority levels are set in advance for the plurality of the versions,
   the control unit is configured to decide the version to be used for the power control protocol communication based on the priority levels,
   the communication unit is configured to acquire information on a result of a past power control protocol communication for each of the plurality of the versions, and
   the control unit is configured to decide the version to be used for the power control protocol communication based on the information on the result and the priority levels.

2. The electrified vehicle according to claim 1, wherein the electrified vehicle is any one of a hybrid electric vehicle, a plug-in hybrid electric vehicle, a battery electric vehicle, and a fuel cell electric vehicle.

3. The electrified vehicle according to claim 1, wherein:
   the plurality of the versions includes a first version and a second version with a priority level lower than the priority level of the first version; and
   the control unit is configured to control to switch to communication using the second version when communication using the first version fails in the power control protocol communication.

4. The electrified vehicle according to claim 3, wherein the control unit is configured to control to switch to the communication using the second version with a priority level one level lower than the priority level of the first version when the communication using the first version fails in the power control protocol communication.

5. The electrified vehicle according to claim 1, wherein:
   the information on the result includes information on whether a past power control protocol communication was possible;
   the plurality of the versions includes the version with which the past power control protocol communication was possible and the version with which the past power control protocol communication was not possible; and
   the control unit is configured to decide the version with which the past power control protocol communication was possible as the version to be used for the power control protocol communication.

6. The electrified vehicle according to claim 5, wherein the control unit is configured to, when there is a plurality of the versions with which the past power control protocol communication was possible, decide the version with the highest priority level out of the plurality of the versions with which the past power control protocol communication was possible as the version to be used for the power control protocol communication.

7. The electrified vehicle according to claim 6, wherein the control unit is configured to, when communication using the plurality of the versions with which the past power control protocol communication was possible all fails in the power control protocol communication, control to switch to communication using the version with which the past power control protocol communication was not possible.

8. The electrified vehicle according to claim 7, wherein the control unit is configured to, when the communication using the version with which the past power control protocol communication was not possible is successful, control the communication unit in such a manner that information on whether the power control protocol communication was possible is updated for the version with which the power control protocol communication is successful.

9. The electrified vehicle according to claim 1, wherein:
the communication unit is configured to communicate with a first server storing the information on the result of the power control protocol communication; and
the control unit is configured to control the communication unit in such a manner that the information on the result of the power control protocol communication is acquired from the first server.

10. The electrified vehicle according to claim 9, wherein:
the communication unit is configured to communicate with a second server storing information on the priority levels; and
the control unit is configured to control the communication unit in such a manner that the information on the priority levels is acquired from the second server.

11. An electrified vehicle system, comprising:
a power station configured to be compatible with at least one version of a predetermined communication standard; and
an electrified vehicle configured to perform power control including either or both of charging from the power station and power supply to the power station, wherein:
the electrified vehicle includes a communication unit and a control unit, the communication unit being configured to be compatible with a plurality of the versions of the predetermined communication standard, and the control unit being configured to control the communication unit in such a manner that power control protocol communication between the electrified vehicle and the power station is performed using the predetermined communication standard,
priority levels are set in advance for the plurality of the versions,
the control unit is configured to decide the version to be used for the power control protocol communication based on the priority levels,
the communication unit is configured to acquire information on a result of a past power control protocol communication for each of the plurality of the versions, and
the control unit is configured to decide the version to be used for the power control protocol communication based on the information on the result and the priority levels.

* * * * *